United States Patent [19]

Khoe et al.

[11] Patent Number: 5,126,557
[45] Date of Patent: Jun. 30, 1992

[54] DEVICE FOR OPTICAL HETERODYNE DETECTION AND OPTICAL COMPONENT SUITABLE FOR USE IN SUCH A DEVICE

[75] Inventors: Giok D. Khoe; Kieran G. Wright, both of Eindhoven, Netherlands

[73] Assignee: U.S. Philips Corp., New York, N.Y.

[21] Appl. No.: 591,905

[22] Filed: Oct. 2, 1990

[30] Foreign Application Priority Data

Jun. 13, 1990 [NL] Netherlands ............... 9001331

[51] Int. Cl.⁵ .............................................. G02F 1/01
[52] U.S. Cl. ................................... 250/225; 359/192
[58] Field of Search ............... 250/225; 356/351, 365; 455/616; 359/192

[56] References Cited

U.S. PATENT DOCUMENTS

| | | | |
|---|---|---|---|
| 4,506,388 | 3/1985 | Monerie et al. | 455/616 |
| 4,912,059 | 3/1990 | Newman et al. | 250/225 |
| 5,003,625 | 3/1991 | Khoe | 455/619 |
| 5,003,626 | 3/1991 | Kuwahara et al. | 455/616 |

*Primary Examiner*—David C. Nelms
*Attorney, Agent, or Firm*—William L. Botjer

[57] ABSTRACT

An optical heterodyne or homodyne receiver comprises an integrated optical component (140) in which the local oscillator beam and the signal beam are combined and simultaneouly split into orthogonally polarized sub-beams. The optical component comprises a polarization-sensitive beam-splitting layer in a first face (141) and a second beam-splitting layer in a second face (142) which is perpendicular thereto. This second layer functions as a beam-combining element in the optical receiver and has two distinct portions (142a and 142b), one portion (142a) of which passes and reflects one state of polarization (s) to the desired extent and the other portion (142b) having this property for the other state of polarization (p).

9 Claims, 4 Drawing Sheets

DEVICE FOR OPTICAL HETERODYNE DETECTION AND OPTICAL COMPONENT SUITABLE FOR USE IN SUCH A DEVICE

BACKGROUND OF THE INVENTION

The invention relates to a device for optical heterodyne or homodyne detection of an optical signal beam, which device comprises a local oscillator, an optical system comprising a polarization-sensitive beam-splitting layer for splitting the signal beam into two orthogonally polarized sub-beams and a beam-combining layer for combining signal beam radiation with local oscillator radiation, said device further comprising a detection system for converting the combined radiation into at least one electric signal which is suitable for further processing.

Devices for optical heterodyne detection are used in optical signal transmission. By mixing the signal beam in a heterodyne detection device with an optical beam from a local oscillator, a considerably better result with regard to the signal-to-noise ratio and the discrimination of background radiation is obtained as compared with direct detection of the signal beam.

The principle of heterodyne detection of optical radiation has been extensively described in the article "Optical Heterodyne Detection" by O. E. DeLange in the journal "IEEE Spectrum" of October 1968, pp. 77–85. As has been stated in this article, it is important that the states of polarization of the signal beam and the local oscillator beam correspond as much as possible. A possible solution to achieve this is to split the signal beam into two sub-beams having a mutually orthogonal state of polarization. The two sub-beams are then combined with local oscillator radiation which is polarized in the same state.

In principle, four components are required for splitting and combining the beams: two polarization-sensitive beam splitters for splitting the signal beam and the local oscillator beam, respectively, and two beam-combining elements for combining the sub-beams formed. By firstly combining the signal beam with the local oscillator beam and only thereafter splitting it by means of a polarization-sensitive beam splitter into two orthogonally polarized sub-beams, one of the beam-combining elements can be dispensed with. Since a beam-combining element not only has two inputs but necessarily also two outputs, two polarization-sensitive beam splitters remain required to receive and detect all signal radiation.

A device as described in the opening paragraph is known from EP-A 0,345,889, which corresponds to U.S. Pat. No. 5,003,625 see FIG. 3 of said document. In this device the beam-splitting and beam-combining elements are integrated in an optical component comprising two beam-splitting layers. The first layer is a polarization-sensitive beam-splitting layer, while the other beam-splitting layer is neutral with regard to the state of polarization of the incident light and is used as a combining element. However, a layer which is really polarization-sensitive is difficult to make and is thus expensive. Such a really neutral layer in the known device is required because polarization effects which would otherwise occur on this layer functioning as a beam-combining element will have a distinct effect on the operation of the coherent detection device.

SUMMARY OF THE INVENTION

The invention has, inter alia, for its object to provide an optical heterodyne or homodyne detection device as described in the opening paragraph in which a layer which is really polarization-insensitive is dispensed with.

To this end the device according to the invention is characterized in that the beam-combining layer comprises two portions each of which has a polarization-dependent transmission and/or reflection coefficient and each of which is arranged in the radiation path of one of the sub-beams for passing and reflecting the radiation in the respective sub-beam to the desired extent. The invention is based on the recognition that in the embodiment according to FIG. 3 of EP-A 0,345,899 the radiation beams which are incident on the beam-combining layer do not have an arbitrary polarization, but are polarized in a fixed state. The beam-combining layer thus need not be really neutral with regard to the state of polarization but it may be sufficient to use a layer having the desired, for example, equal transmission and reflection coefficient for radiation of the state of polarization incident on the layer. Such layers are considerably cheaper and easier to make than really polarization neutral layers.

An embodiment of the device according to the invention is further characterized in that each of the two portions of the beam-combining layer is individually optimized for passing and reflecting radiation to the desired extent, which radiation is linearly polarized in the p and s directions, respectively, with respect to the polarization-sensitive beam-splitting layer. In practice, a coherent diversity detector is often implemented for constructive reasons with polarization filters which select linear states of polarization and with beams which extend at an angle of approximately 45° to the beam-splitting faces.

A further embodiment of a device according to the invention in which the optical system is integrated to an optical component is characterized in that the optical component has at least one reflecting face which is arranged in a light path of an entrance or exit radiation beam for deflecting said radiation beam. The optical fibers or waveguides with which the entrance and exit radiation beams are supplied or removed can then be arranged in different directions and in different positions so that a compact or simple construction of the device is possible. The reflecting faces are preferably arranged at an angle of 45° so that the deflection is effected through 90°.

This embodiment may be further characterized in that said reflecting face extends at an angle of approximately 45° to the face in which the light paths of the radiation beams are situated within the optical component. In this manner the entrance and exit radiation beams can be connected to the "upper" or "lower side" of the optical component. The device is preferably characterized in that at least one reflecting face is arranged in the light path of an entrance beam for deflecting a beam coming from a first direction, in that at least one reflecting face is arranged in the light path of an exit beam for deflecting the exit beam towards a second direction and in that said first and second directions are diametrically opposed directions. The entrance radiation beams can then be situated at the "upper side" and the exit radiation beams can be situated at the "lower side" of the optical component, or at the "front side"

and the "rear side". This provides the extra advantage that it does not require any radiation guides between the optical component and the radiation-sensitive detectors which can then be arranged directly on the face of the optical component.

Reflections occur at the entrance and exit faces in the coherent detection device, inter alia, at the faces of the light guides and the other optical components. For example, due to repeated reflections and interference phenomena therebetween, such reflections may disturb the reception of the signal, which disturbance should be avoided as much as possible. Reflections can be reduced, for example, by providing an anti-reflection coating. To reduce the disturbing influence of the remaining reflections on the faces of the integrated optical component to a further extent, the device according to the invention is characterized in that it has at least one entrance or exit face whose normal extends at an angle to the light path of a radiation beam through said entrance or exit face, said angle having a value of between approximately several tenths of a degree and several degrees. Since the entrance and/or exit faces are slightly oblique, of the order of 1°, with respect to the radiation beam passing through them, the radiation reflected on the face is not received in the light guides. The reception of the signal is not disturbed. To avoid radiation losses due to reflections, an anti-reflection coating is preferably applied. This coating may have a relatively low quality and a residual reflection of approximately 0.5%.

For this purpose the entrance or exit faces of the light guides may also be arranged obliquely on the light guides, as is known from the contribution by C. K. Wong et al., entitled "General purpose single-mode laser package provided with a parallel beam output having −60 dB interface feedback", to the fourteenth ECOC Conference held in Brighton in September 1988 and published on pp. 215-218 of the proceedings of this conference.

In accordance with a further aspect of the invention the optical system comprises one or more prisms whose apex angles face one another. The device according to the invention is characterized in that the optical system comprises at least one prism having two side faces which enclose an apex angle and in that said two side faces are provided with a portion of the beam-splitting and beam-combining layers, respectively. Due to this measure the tolerances which should be taken into account when composing the optical system to one component may be less accurate. In this case the quality of the component is determined by the quality of the prisms with the layers provided thereon and to a much lesser extent by the accuracy which has been taken into account during assembly. The apex angle of the prism is preferably 90°.

BRIEF DESCRIPTION OF THE DRAWING

These and other more detailed aspects of the invention will be described in greater detail with reference to the drawings.

In the drawings

DETAILED DESCRIPTION OF THE PREFERRED EMBODIMENT

Figure 1:
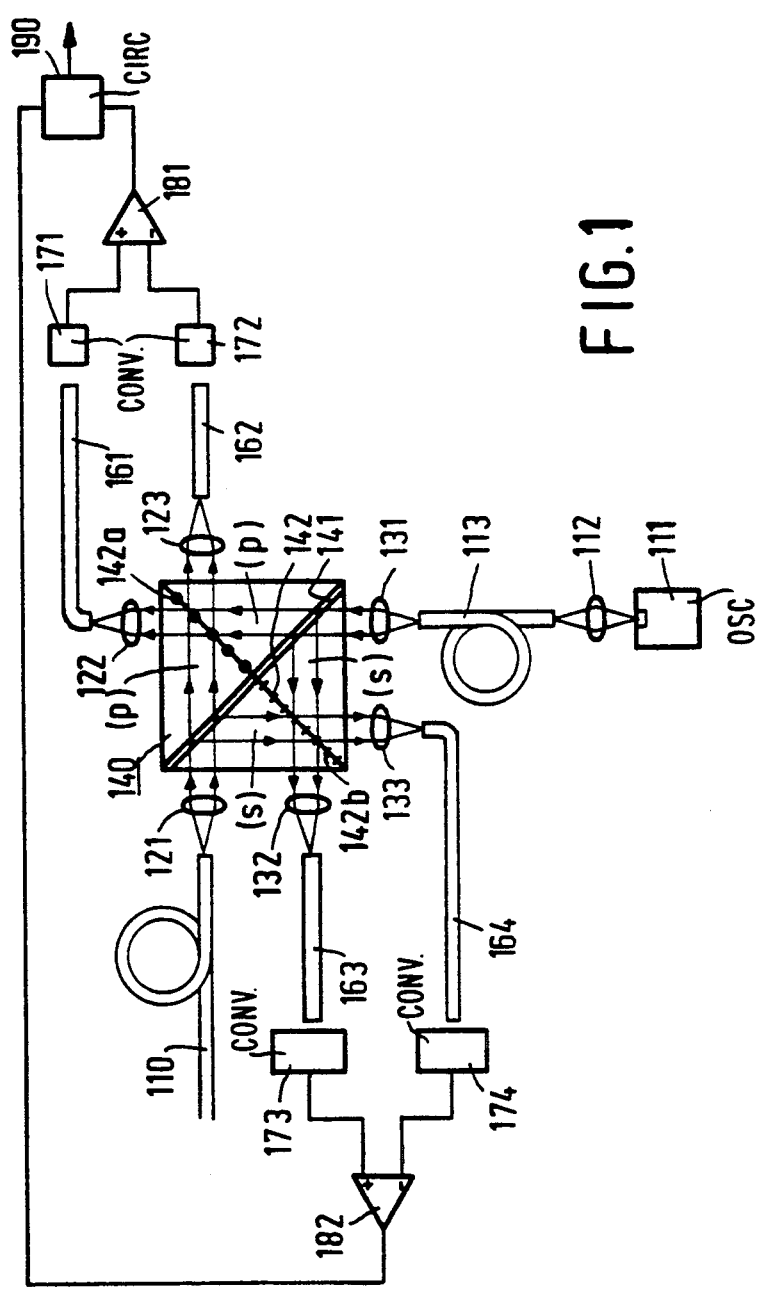
FIG. 1 shows a device according to the invention.

FIG. 1 shows diagrammatically a device for optical heterodyne or homodyne detection. The signal beam, coming from an optical transmission fiber 110, is converted by means of a lens 121 into a parallel beam which is incident on a first input of the optical system or the optical component 140. Radiation which is incident on a second input of the optical system 140 via the lens 112, the fiber 113 and the lens 131 is generated in a local oscillator 111. The system 140 is implemented as a component and has two planes 141 and 142 which extend at right angles to each other. A polarization-sensitive beam-splitting layer is provided in the plane 141. The plane 142 comprises two portions 142a and 142b on both sides of the plane 141. A beam-splitting layer is provided in each portion. The signal beam and the local oscillator beam are split by the beam-splitting layer in the plane 141 into two sub-beams having mutually perpendicular directions of polarization. In the Figure this is indicated by means of the symbols (p) and (s), the direction of polarization of the ongoing beams being referred to as the parallel direction (p) and the direction of polarization of the beams reflected on the plane 141 being referred to as the perpendicular direction (s). The two sub-beams with a parallel (p) direction of polarization are each split at the same location on the layer 142a into two sub-beams of equal intensity, the ongoing part of the signal beam being combined with the reflected part of the local oscillator beam, and vice versa. The beam-splitting layer 142a thus acts as a beam-combining element. The two resultant combined sub-beams are passed to the opto-electrical converters 171 and 172 via the lenses 122 and 123 and the fibers 161 and 162. Analogously, the s-polarized sub-beams of the local oscillator beam and the signal beam are combined on the layer 142b and passed to the opto-electrical converters 173 and 174 via the lenses 132 and 133 and the fibers 163 and 164.

The locations on the plane 142 where the parallel p-polarized radiation beams and the s-polarized radiation beams are incident are spatially separated from each other. The beam-splitting layer in this plane 142 thus need not be identical throughout. For the operation of the device it is sufficient that this portion of the face on which the incident radiation is p-polarized is provided with a beam-splitting layer 142a which passes and reflects radiation polarized in this state to an equal extent, while the portion 142b of the plane 142 on which s-polarized radiation is incident only reflects and passes radiation in this state of polarization to an equal extent.

Since the two output signals of the two sub-beams are in phase opposition to each other, the electric output signals of the two opto-electrical converters are combined by supplying these signals to a differential amplifier. The signals of the converters 171 and 172 are combined in a differential ampiifier 181, those of the converters 173 and 174 are combined in the differential amplifier 182. Not only does this use all the power in the signal beam but it has also the advantage that the noise of the local oscillator beam is reduced in the differential amplifier. Finally, the output signals of the differential amplifiers 181 en 182 are combined in the circuit 190 whose output is an electric signal which is modulated with the same information as the optical signal which is supplied to the device via the transmission fiber 110.

In the above description the beam-combining layers 142a and 142b are implemented as layers which pass and reflect the same quantity of radiation. In principle it is possible to implement the layers in such a way that the sub-beams formed have a different intensity.

Figure 2A:
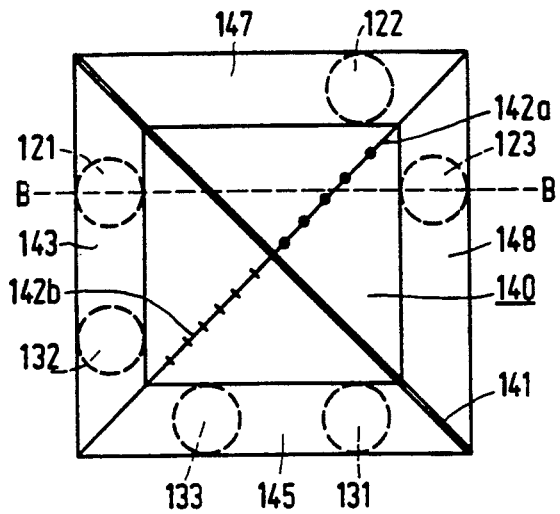
FIGS. 2a and 2b show integrated optical components with reflecting faces in the radiation paths of the entrance and exit beams.

FIG. 2a shows an embodiment in which the optical component 140 has reflecting faces for deflecting the entrance and exit beams. The embodiment shown is a modification of the embodiment shown in FIG. 1 and is described with reference to that Figure. Only the modified optical component 140 is shown in FIG. 2a.

As in FIG. 1, the optical component 140 has a polarization-sensitive beam-splitting layer 141 and beam-splitting layers 142a and 142b in one plane. The sides of the component 140 are bevelled at an angle of 45° so that each one of the four sides has a reflecting face 143, 145, 147 or 148. These reflecting faces enable the entrance and exit radiation beams to be reflected on these faces before and after they are split and combined by the beam-splitting layers 141, 142a and 142b. In the plan view shown in FIG. 2a the positions of the entrance and exit beams are denoted by lenses 121, 131, 122, 123, 132 and 133 in broken lines.

Figure 2B:
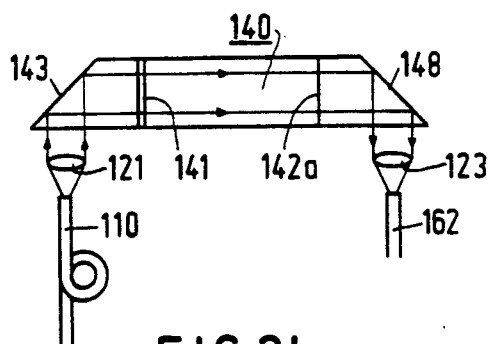

FIG. 2b is a side elevation of the optical component of FIG. 2a taken on the line B—B. The signal beam is launched into the component 140 from the fiber 110 via the collimator lens 121. In this component the beam is reflected on the face 143, split into perpendicularly polarized components by the polarization-sensitive beam splitter 141 and one of the components traverses the beam-splitting layer 142a where it is combined with a part of the local oscillator radiation. The combined beam is subsequently passed towards a detector via the reflecting face 148, the lens 123 and the radiation guide 162.

Figure 3B:
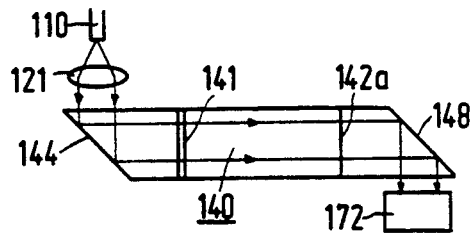
FIGS. 3a, 3b and 3c show an alternative embodiment thereof.
Figure 3A:
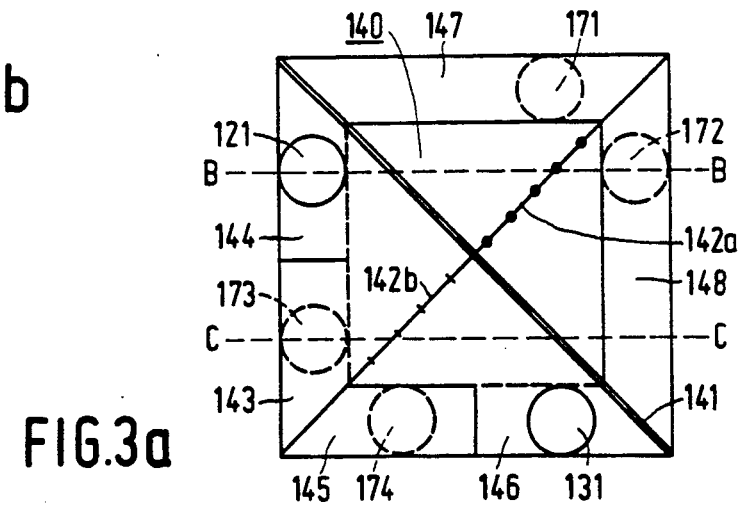
Figure 3C:
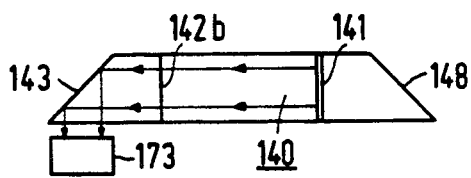

FIGS. 3a, 3b and 3c show other embodiments of an optical component according to the invention. Identical reference numerals denote comparable parts in FIGS. 2a and 2b. Unlike the embodiments shown in FIGS. 2a and 2b, the entrance beams are incident from above and are reflected on the faces 144 and 146, while the exit beams exit at the lower side after reflection on the faces 143, 145, 147 and 148. In this way the lower side can be entirely used for providing means for receiving the exit radiation beams, for example, by arranging the radiation-sensitive detectors directly on the lower side as is shown by means of the broken line circles 171, 172, 173 and 174.

FIGS. 3b and 3c are side elevations of cross-sections taken on the lines B—B and C—C. In FIG. 3b the signal beam enters via the radiation guide 110 and the collimator lens 121. The beam is reflected on the face 144, traverses the beam-splitting layer 141 and the beam-combining layer 142a and is reflected via the face 148 towards the detector 172 which is directly arranged at the lower side of the component 140. FIG. 3c shows a beam which is incident on the detector 173 via the beam-splitting layer 141 and the beam-combining layer 142b and the reflecting face 143.

Figure 4:
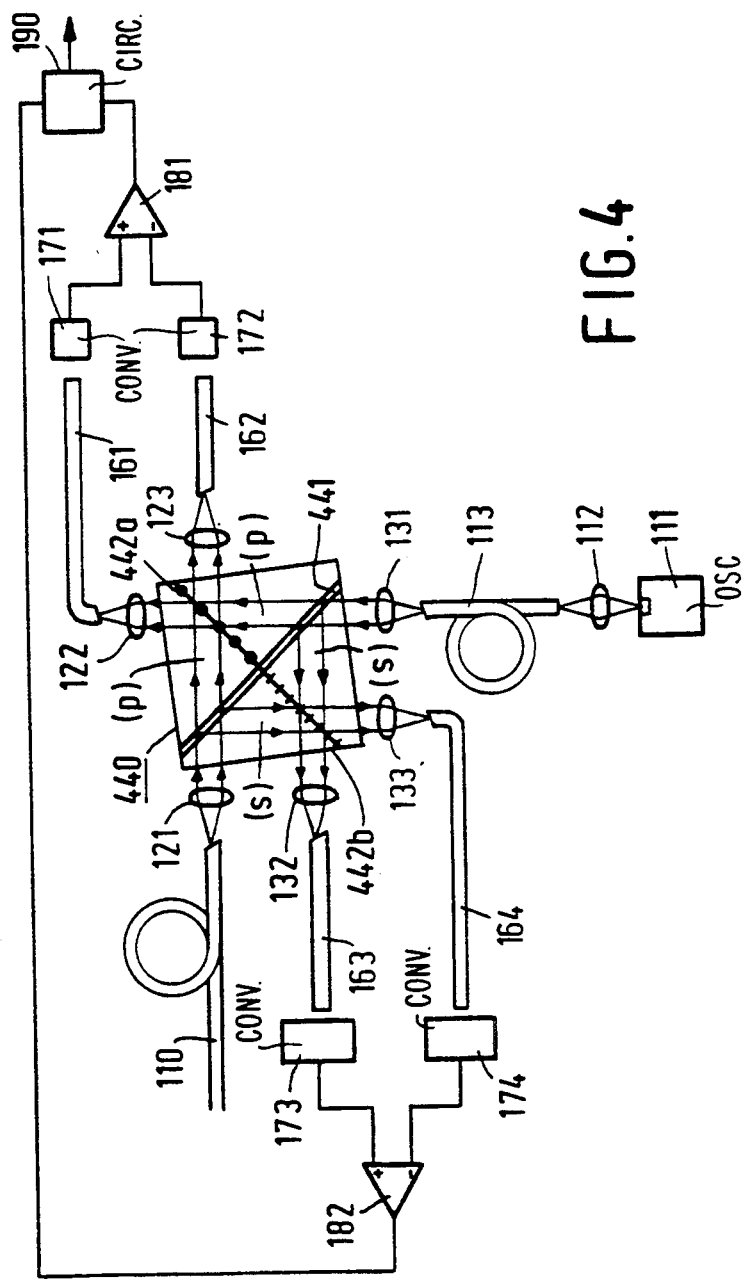
FIG. 4 shows an embodiment of the integrated optical component in which the entrance and exit faces of the elements are oblique so as to eliminate disturbing reflections.

To reduce radiation losses at the air-to-glass interfaces of the optical component and particularly to prevent reflections on these surfaces from being disturbing, the entrance and exit faces of the optical component are provided with an anti-reflection coating. An anti-reflection coating alone is, however, not always sufficient to prevent any disturbing influence of reflected light. According to the invention the entrance and exit faces of the optical component are therefore arranged obliquely so that the normal of the faces extends at an angle of approximately 1° to the direction of the radiation beam passing therethrough. This is shown diagrammatically in FIG. 4. FIG. 4 is largely identical to FIG. 1 with the exception of the optical component and the ends of the light guides. Reference is made to FIG. 1 for a description of the elements which will not be described hereinafter. The optical component 440 has entrance and exit faces whose normal extends at an angle of approximately 1° to the direction of the radiation beams passing therethrough. The polarization-sensitive beam-splitting layer 441 and the beam-combining layers 442a and 442b have, however, the same position relative to the radiation beams as the corresponding planes 141, 142a and 142b in FIG. 1. Since the entrance and exit faces are arranged obliquely, radiation reflected thereon is not received in the light guides and thus has no disturbing influence on the detection system. Since the disturbing influence of the reflections is eliminated in this manner, the anti-reflection coating only serves to reduce radiation losses. Therefore it is not necessary to apply a very high-grade anti-reflection coating on the faces of the component 440 but it will be sufficient to use an anti-reflection coating having a residual reflection of approximately 0.5%.

The optimum angle of obliqueness of the side faces of the optical component 440 depends on the distance to and the diameter of the collimator lenses 121-133 and is in the range of several tenths of a degree to several degrees. Also the end faces of the radiation guides 110, 113, 161, 162, 165 and 164 may be arranged obliquely with respect to the direction of the radiation beam. For a further description thereof reference is made to the afore-mentioned contribution by C. K. Wong et al. to ECOC 88, held in Brighton in September 1988. The oblique entrance and exit faces may also be used in combination with reflective faces shown in FIGS. 2 and 3.

In the embodiment described the angles between beam-splitting layers are right angles because the exit sub-beams of the local oscillator beam should have a direction which is equal to that of the exit sub-beams of the signal beams. However, it is not necessary for the beam-splitting layers to extend at right angles to each other.

Figure 5:
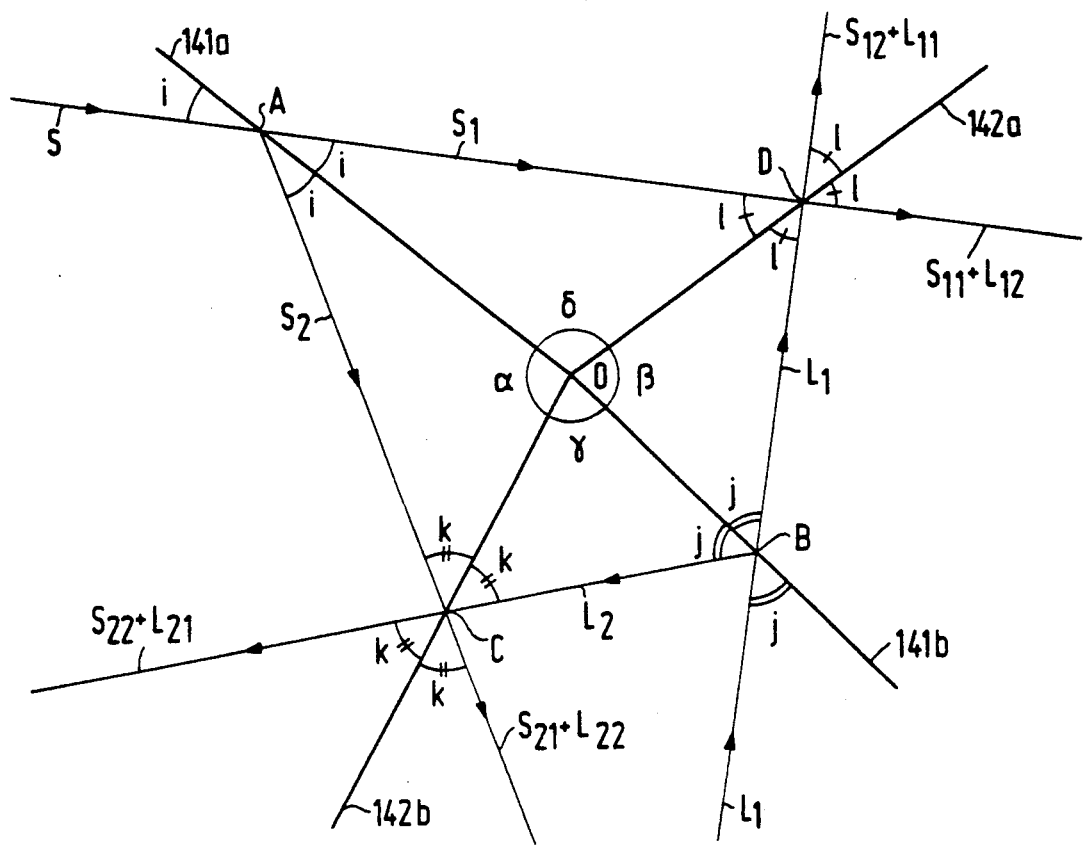
FIG. 5 illustrates the requirements with which the mutual angles of the beam-splitting layers should comply.

This is illustrated in FIG. 5. In this Figure the four portions 141a, 141b, 142a and 142b of the beam-splitting layers are shown in which the portions mutually enclose the angles $\alpha$, $\gamma$, $\beta$ and $\delta$ at the common point 0. A first radiation beam S, for example, the signal beam is incident on the plane 141a, the direction of the beam extending at an angle i to the plane 141a. In the plane the beam S is split into two sub-beams $S_1$ and $S_2$ which leave the plane at the same angle i. The two sub-beams $S_1$ and $S_2$ are incident on the planes 142a and 142b, respectively, the angles of incidence on the planes having the values l and k. In the plane 142a the sub-beam $S_1$ is again split into two sub-beams $S_{11}$ and $S_{12}$ which leave the plane at the same angle l as the angle of incidence. The same applies to the plane 142b where the sub-beam $S_2$ is split into two sub-beams $S_{21}$ and $S_{22}$ which leave the plane at an angle k which is equal to the angle of incidence in said plane.

The second entrance beam L which is incident at an angle j on the plane 141b is analogously split into sub-beams $L_1$ and $L_2$ which in their turn are split in the planes 142a and 142b into sub-beams $L_{11}$, $L_{12}$, $L_{21}$ and $L_{22}$. If the sub-beams $L_{11}$, $L_{12}$, $L_{21}$ and $L_{22}$ have the same direction as the sub-beams $S_{12}$, $S_{11}$, $S_{22}$ and $S_{21}$, respectively, the sub-beam $L_1$ is incident on the plane 142a at an angle l and the angle between sub-beam $L_2$ and the plane 142b is equal to k.

The relations between the angles in FIG. 5 are: for the triangle OAC: $\alpha+i+k=180°$; for the triangle OCB: $\gamma+k+j=180°$, for the triangle OBD: $\beta+j+l=180°$; for the triangle ODA: $\delta+l+i=180°$; and for the square ABCD: $2(i+j+k+l)=360°$. It follows directly from these relations that $\alpha+\beta=\gamma+\delta=180°$. The sum of two facing angles $\alpha$ and $\beta$, or $\gamma$ and $\delta$, must thus be 180° so as to achieve that the exit sub-beams of the signal beam and the local oscillator beam exit in the same direction.

A shift of the planes 141a, 141b, 142a and 142b with respect to each other, so that the planes do not have a common point O, has no influence on the direction of the exit beams but on the mutual distance between the principal axes of the beams. In a practical embodiment the existence of such a mutual distance can be solved by rendering the beam diameters so large by means of the collimator lenses that a sufficient extent of overlap on the detectors is obtained, even when the beams are slightly shifted with respect to each other.

Figure 6:
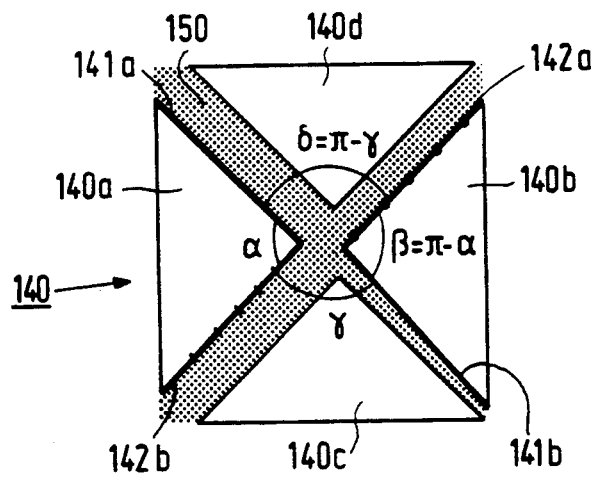
FIG. 6 shows a special embodiment of the optical component.

FIG. 6 shows an embodiment of the optical component 140 in which the principle described hereinbefore is used. The component comprises four subprisms 140a, 140b, 140c and 140d whose side faces are sealed to each other by means of an optical adhesive 150 whose refractive index after curing is equal to that of the material of the prisms. The apex angles $\alpha$ and $\beta$ of the prisms 140a and 140b are chosen to be such that their sum is 180°. The beam-splitting layers 141a and 142b are provided on the two side faces of the prism 140a facing the prisms 140d and 140c, respectively. The layers 142a and 141b are provided on the side faces of the prism 140b facing the prisms 140d and 140c. By providing the beam-splitting layers in this manner, the mutual angle between the beam-splitting faces is ensured, even when the alignment between the four prisms after sealing is not optimum. Each angle $\alpha$ and $\beta$ preferably has a value of 90°, but as has been apparent from the foregoing, a different choice is possible. When combining the prisms 140a, 140b, 140c and 140d to one component, an accurate alignment of the prisms with respect to each other is not necessary. Since the quality of the components is determined by the two prisms 140a and 140b, the other prisms (140c and 140d) may be less accurate and hence less expensive. The two prisms 140c and 140d may even be dispensed with by filling up their space with adhesive. When measures are taken which allow for a variation of the refractive index at the location of the faces 141 and 142, the space for the prisms 140c and 140d may even remain completely empty.

We claim:

1. A device for optical heterodyne or homodyne detection of an optical signal beam, which device comprises a local oscillator, an optical system comprising a polarization-sensitive beam-splitting layer for splitting the signal beam into two orthogonally polarized sub-beams (s and p) and a beam-combining layer for combining signal beam radiation with local oscillator radiation, said device further comprising a detection system for converting the combined radiation into at least one electric signal which is suitable for further processing, characterized in that the beam-combining layer comprises two portions each of which has a polarization-dependent transmission and/or reflection coefficient and each of which portion is arranged in the radiation path of one of the sub-beams for passing and reflecting the radiation in the respective sub-beam to the desired extent.

2. A device as claimed in claim 1, in which the radiation is incident on the beam-combining layer at an angle of substantially 45° to the angle of the radiation beam and in which said sub-beams are linearly polarized, characterized in that each of the two portions of the beam-combining layer is individually optimized for passing and reflecting radiation to the desired extent, the sub-beams are linearly polarized in the p and s directions, respectively, with respect to the polarization-sensitive beam-splitting layer.

3. A device as claimed in claim 1 in which the optical system is integrated to an optical component, characterized in that the optical component has at least one reflecting face which is arranged in a light path of an entrance or exit radiation beam for deflecting said radiation beam.

4. A device as claimed in claim 3, characterized in that said reflecting face extends at an angle of approximately 45° to said light path.

5. A device as claimed in claim 3, characterized in that said reflecting face extends at an angle of approximately 45° to the face in which the light paths of the radiation beams are situated within the optical component.

6. A device as claimed in claim 4, characterized in that at least one reflecting face is arranged in the light path of an entrance beam for deflecting a beam coming from a first direction, in that at least one reflecting face is arranged in the light path of an exit beam for deflecting the exit beam towards a second direction and in that said first and second directions are diametrically opposed directions.

7. A device as claimed in claim 3, characterized in that the optical component has at least one entrance or exit face whose normal extends at an angle to the light path of a radiation beam through said entrance or exit face, said angle having a value of between approximately several tenths of a degree and several degrees.

8. A device as claimed in claim 1, characterized in that the optical system has at least one prism having two side faces which enclose an apex angle and in that said two side faces constitute a portion of the beam-splitting and beam-combining layers, respectively.

9. A device as claimed in claim 8, characterized in that the apex angle of said prism has a value of 90°.

* * * * *